Dec. 29, 1942.  R. E. BURK  2,306,933
DESULPHURIZING HYDROCARBONS
Filed Aug. 11, 1939
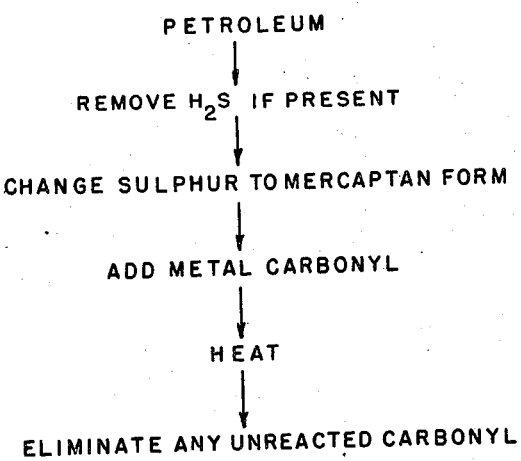
INVENTOR.
ROBERT E. BURK
BY
ATTORNEYS Patented Dec. 29, 1942

2,306,933

UNITED STATES PATENT OFFICE 2,306,933

DESULPHURIZING HYDROCARBONS

Robert E. Burk, Cleveland Heights, Ohio, assignor to The Standard Oil Company, Cleveland, Ohio, a corporation of Ohio Application August 11, 1939, Serial No. 289,625

5 Claims. (Cl. 196—28)

As well known, hydrocarbons are prone to contain sulphur in multitudinous forms, including hydrogen sulphide, mercaptans, sulphides, disulphides, thiophenes, etc. Iron carbonyl furnishes a desirable means for removing sulphur. I have found however that there are peculiarities of actions and conditions which should be taken account of, if most efficient use is to be made of such reagent. It is especially efficient with some kinds of sulphur compounds, and less so or uneconomical with others. In accordance with the present invention therefore, a particularly efficient action upon the various forms of sulphur compounds which may be encountered in hydrocarbons, may be accomplished, without undue complication and expense.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

In the annexed drawing:

The sole figure is a flow sheet illustrating an embodiment of the invention.

For hydrocarbons, petroleum and the like, containing mercaptans and non-mercaptans I prefer to subject the material first to the action of bauxite. Conveniently, vapors of the material if distillate may be contacted with a bed of bauxite or the like. Crude petroleum can also be contacted with the reagent in bed form. After passing through the bauxite, the hydrocarbon material receives an admixture of iron carbonyl, and the temperature if not sufficiently high for this reaction must be raised to at least 300° F., and temperatures of 400–650° F. are especially desirable for the carbonyl action. Higher temperatures may be used but are unnecessary, and it is desirable to avoid cracking temperature. Elevated pressures may be used, but are not necessary. Crude petroleum on its way to the heating coil or pipe still may thus, as indicated, be first contacted with the bauxite or the like and then be charged with the carbonyl. Reduced crude before passing to a vacuum pipe still may similarly be handled. The treatment by the bauxite is found to change non-mercaptan sulphur to mercaptan sulphur, and other clays and ores or oxides or sulphides or mixtures of oxides and sulphides of metals such as molybdenum, tungsten, iron, nickel, cobalt, copper, etc., may be similarly employed in some cases; and with conversion more uniformly to mercaptan sulphur, the carbonyl is especially advantageously able to complete the desired action. Instead of passing the hydrocarbons through a bed of bauxite or the like, in some cases it may be applied as a slurry in the oil.

With some distillates or oils it is preferable to heat up to reaction temperature and then add the carbonyl. And for carbonyl uses it will be understood that in some instances carbonyls of other metals, nickel, etc., or mixtures may be used instead of iron carbonyl, and are equivalents in the designation "iron carbonyl."

Crude petroleum may be distilled to separate out the light distillates, then the residuum may be contacted with bauxite or other clay, and carbonyl be added and by heating to above 300° F. but below cracking temperature, more hydrocarbon be distilled off, and then more carbonyl be added to the residue, and so on. In some cases it is advantageous to separate petroleum into low boiling fractions and high boiling fractions by distillation, then treat the low boiling portions with caustic soda wash or regenerated or modified caustic and the like, and separately treat the higher boiling fraction or fractions with iron carbonyl at reaction temperature as above indicated. By adding the carbonyl to the heavier residuum after distilling off the lightest hydrocarbons, an advantageous protection of the apparatus against corrosion in the further treatment may be had and also a desirable division of deposits resulting from the carbonyl, which in some instances may be inherently quite voluminous, so much so as to be undesirable if the carbonyl be all applied in one step.

If the carbonyl be introduced all at once before entering the cracking coil in a cracking system, the deposits may be undesirable at such stage. A suitable amount of carbonyl may be introduced if desired into the hot cycle gas oil which is being returned to the cracking coil in a cracking system, and the carbon monoxide separated by the reaction may be vented out, and the colloidal solution of iron produced may then be admixed with the main feed. If carbonyl be introduced between the cracking coil and the soaking drum or timing drum, the deposited solids form a part of the coke in the drum, and in some cases this is disadvantageous. If the carbonyl be introduced between the soaking or timing drum and the separator where run off from the drum is separated into vaporizable portion and tar, the deposited solids will appear in the fuel oil which is produced from the unvaporizable portion in the separator, and such solids may exceed the amount permissible in fuel oil products. It is advantageous to introduce the carbonyl between the separator and the fractionating tower, as it is found that less carbonyl will thereby suffice for the over-head products going from the tar separator. This may be due to avoidance of wasteful reactions with heavy sulphur products which normally go into the tar.

Where the hydrocarbons contain large amounts of hydrogen sulphide, as notably the case with some distillates from certain stocks, before bringing the iron carbonyl into contact therewith I find it preferable to remove the hydrogen sulphide first, using a simple agent as for instance caustic soda wash, or caustic potash or extraction by an amine, or by contacting the hydrocarbons with iron ore. With particular advantage, lime may be introduced and as a slurry be allowed to act, and then iron carbonyl is introduced into the hydrocarbon distillate or the like.

I have also found that by introducing the carbonyl in an amount less than the reaction equivalent of the sulphur present in the hydrocarbon, the action which occurs is the providing of some iron sulphide which then acts as a catalyst in a temperature range of 300–750° F., for splitting off hydrogen sulphide from other sulphur compounds. It is then advantageous to subject the hydrocarbon to caustic soda wash, or caustic soda containing salts of fatty acids, or containing organic compounds such as amines or glycol, or in the case of light distillates partly desulphurized by the iron carbonyl and hydrogen sulphide splitting action, convenient practice in some plants may be a finish treatment of doctor solution or copper salts or the like. In some cases, I may recycle iron sulphide formed from the reaction with iron carbonyl and apply this as the catalyst for splitting off hydrogen sulphide, at the above-noted temperature, the distillate or hydrocarbon then being subjected to treatment as noted for removal of the hydrogen sulphide. Some stocks or distillates are best treated by first removing hydrogen sulphide as above shown, then converting non-mercaptan sulphur compounds to mercaptan type compounds by the bauxite or the like as above detailed, and then incorporating iron carbonyl and completing the treatment, the temperature being in the range as shown for iron carbonyl action.

It is desirable that carbonyl be not left in the final hydrocarbon products, and this may be accomplished by acid treating, or more simply by heating the carbonyl-containing liquid to a temperature about 400° F. under conditions allowing the carbon monoxide dissociation product to freely escape, or by having a small amount of water vapor or steam present, a depolarizing action may be had with dissociation of the residual carbonyl and removal of the carbon dioxide.

Other modes of applying the principle of the invention may be employed, change being made as regards the details described, provided the features stated in any of the following claims, or the equivalent of such, be employed.

I therefore particularly point out and distinctly claim as my invention:

1. A process of removing sulphur compounds from petroleum, comprising eliminating any hydrogen sulphide, heating the petroleum and separating lighter and heavier portions, conditioning the heavier portion for the action of metal carbonyl by subjecting the material under mercaptan forming conditions at a temperature below 400° F. to an agent for converting non-mercaptan sulphur to mercaptans, then subjecting the treated material to the action of metal carbonyl at a temperature between 300 and 650° F., and finally eliminating any unreacted metal carbonyl.

2. A process of removing sulphur compounds from petroleum, comprising eliminating any hydrogen sulphide, conditioning the petroleum for the action of metal carbonyl by subjecting the petroleum under mercaptan forming conditions at a temperature below 400° F. to an agent for converting non-mercaptan sulphur to mercaptans, then subjecting the treated petroleum to metal carbonyl in amount less than the reaction equivalent of sulphur present at a temperature between 300° F. and 650° F., and separating and returning metal sulphide formed to an earlier stage in the process.

3. A process of removing sulphur compounds from hydrocarbon material containing the same, comprising conditioning the material for the action of iron carbonyl by subjecting the material under mercaptan forming conditions at a temperature below 400° F. to the action of an agent for converting non-mercaptan sulphur in the hydrocarbon material to mercaptans, then subjecting the treated material to the action of metal carbonyl at a temperature between 300 and 650° F.

4. A process of removing sulphur compounds from hydrocarbon material containing the same, comprising conditioning the material for the action of iron carbonyl by subjecting the material under mercaptan forming conditions at a temperature below 400° F. to the action of an agent for converting non-mercaptan sulphur in the hydrocarbon material to mercaptans, then passing the treated material through heating and separating zones, the heating being at 300–650° F., and adding metal carbonyl at different points to avoid deposit of reaction products all at once.

5. A process of removing sulphur compounds from petroleum, comprising conditioning the petroleum for the action of metal carbonyl by subjecting the material under mercaptan forming conditions at a temperature below 400° F. to an agent for converting non-mercaptan sulphur to mercaptans, heating the petroleum and passing it to and through a separator zone, then introducing metal carbonyl into the petroleum and passing the petroleum to a fractionating zone, at a temperature between 300° and 650° F.

ROBERT E. BURK.